Feb. 5, 1957
G. GOODING
2,780,797
WARNING SIGNAL TO DISCONNECT VEHICLE LIGHTS
Filed June 14, 1954
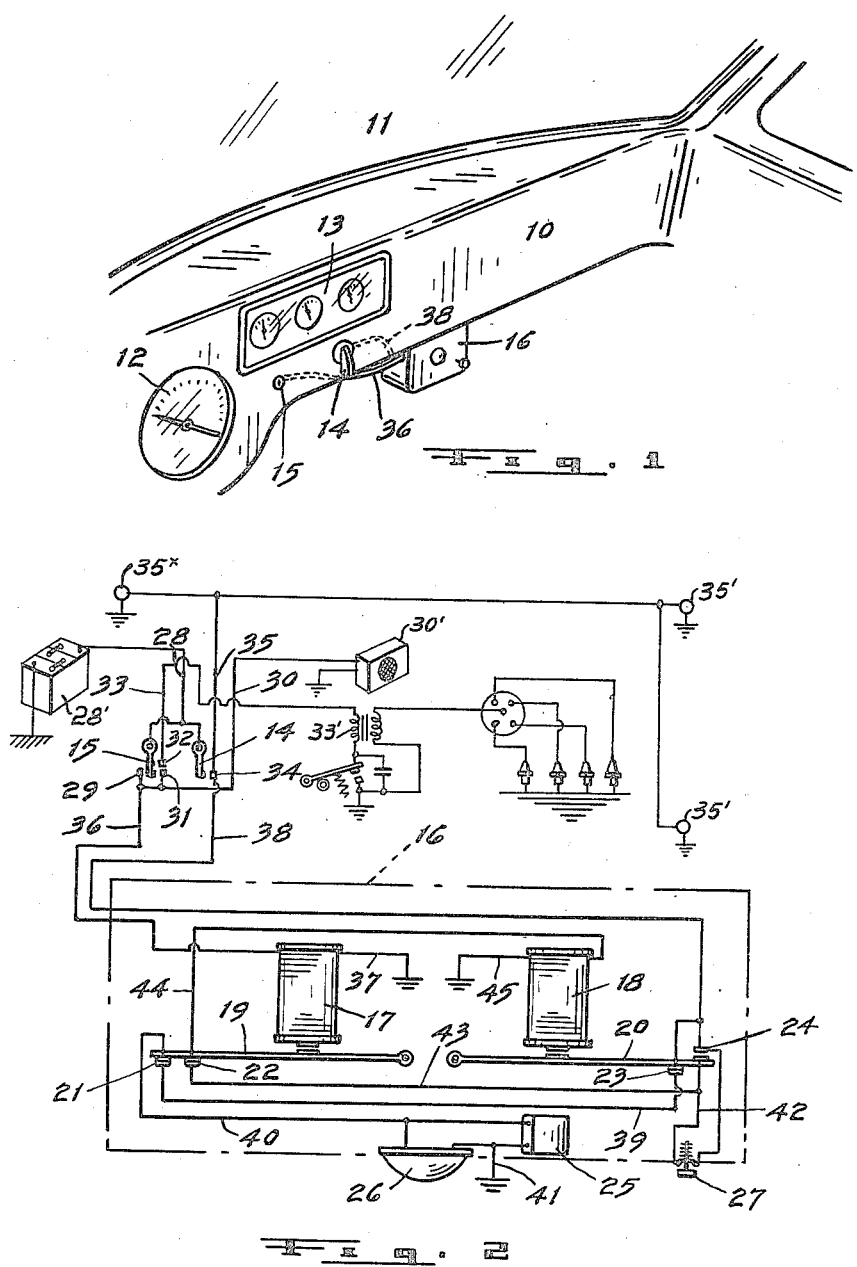
Inventor
Gordon Gooding
Agent United States Patent Office 2,780,797
Patented Feb. 5, 1957

2,780,797
WARNING SIGNAL TO DISCONNECT VEHICLE LIGHTS

Gordon Gooding, Transcona, Manitoba, Canada

Application June 14, 1954, Serial No. 436,643

2 Claims. (Cl. 340—52)

It is quite a common occurrence for a motorist to park his automobile and walk away from same without noticing that the lights of the automobile are on. The headlights particularly are a heavy drain on the battery and, if the motorist delays his return for a rather long time, he finds on coming back that the battery is so depleted he cannot start the motor with the starter.

The principal object of the present invention is to provide a warning signal to the motorist when the automobile lights are on and the motor is stopped.

A further object of the invention is to design said device whereby the signal is shut off when the motor is running.

A further object of the invention is to provide means whereby a simple manual operation will shut off the signal if the motorist desires to keep the lights on with the motor stopped.

A further object of the invention is to contain all the parts for said device within a single casing which can be suitably mounted in the automobile and only requires the connection of two wires to the automobile wiring.

A still further object of the invention is to construct the device in a simple and inexpensive manner, without interfering with the automobile wiring, with very few parts so little trouble can be experienced, while the device itself will efficiently operate for a long period of time.

With the above important objects in view the invention consists essentially in the construction and arrangement of the various parts hereinafter more particularly described, reference being had to the accompanying drawings in which:

Figure 1 is a perspective view of the dash of an automobile showing the device thereunder as an attachment thereto.

Figure 2 is a schematic diagram of the wiring circuit for same.

In the drawings like characters of reference indicate corresponding parts in the several figures.

The dash of an automobile is generally indicated at 10 in Figure 1 with a windshield 11 projecting upwardly therefrom. The dash is provided with the usual speedometer 12, instruments such as the ammeter, oil gauge and gasoline gauge under one cover 13, a light switch 14 and an ignition key switch 15. The casing of the light signal, which comprises this invention, is shown at 16 as an attachment below the dash.

The interior of the casing 16 (see Figure 2) is provided with a pair of induction coils 17 and 18 which are adapted to magnetically operate a pair of pivoted keepers 19 and 20, the keeper 19 controlling a pair of spaced normally closed make-and-break contacts 21 and 22 while the keeper 20 controls a similar pair of make-and-break contacts 23 and 24, the contacts 23 being normally closed and those 24 being normally open. An electric buzzer 25 is also included in the casing while a light 26 and an open finger-pressure switch 27 are carried by the walls and project outwardly therefrom.

The light switch 14 and ignition switch 15 on the dash are shown in the wiring diagram of Figure 2 as are also the following parts of the conventional automobile wiring. The main wire 28 carrying current from the automobile battery 28' connects to one side of both switches 14 and 15. When the ignition switch 15 is turned in one direction it connects with a contact 29 having a wire 30 connected thereto which is used for various accessories on the automobile, such as a radio 30'. When the ignition switch is turned in the opposite direction it connects with a pair of contacts 31 and 32. The contact 31 is also connected to the wire 30 while the contact 32 is connected with a wire 33 which passes to the ignition coil 33' of the automobile motor. The light switch 14 swings to a number of contacts for various lights but just one contact 34 is shown and this connects, through a wire 35, with the headlights 35' and tail light $35^x$ of the automobile. This is all standard automobile equipment.

In the present invention, one end of a wire 36 connects to either the contact 29 or 31 of the above mentioned ignition switch. The opposite end of this wire passes into the casing 16 of the light signal and connects with one end of the induction coil 17. The opposite end of the coil 17 is connected by a wire 37 to ground for return back to the battery 28' of the automobile. One end of a wire 38 connects to the contact 34 of the automobile light switch and the other end also passes into the casing 16 and connects to one side of each of the contacts 23 and 24 and to one side of the finger-pressure switch 27. The other side of the contacts 23, through a wire 39, connects to one side of the contacts 21. The other side of the contacts 21, through a wire 40, connects to one side of the light 26 and one side of the buzzer 25. The opposite sides of the light and buzzer connect to ground through a wire 41. The opposite side of the contacts 24 connect, through a wire 42, with the opposite side of the finger-pressure switch 27 and, through a wire 43, with one side of the contacts 22. The opposite side of the contacts 22, through a wire 44, connects to one end of the induction coil 18. The opposite side of the coil 18, through a wire 45, connects to ground. It will be seen that all the parts mentioned in this paragraph are contained in or carried by the casing 16 (see dot and dash lines in Figure 2) and only the two wires 36 and 38 extend outside for connection to the automobile wiring.

In operation, if the ignition switch 15 is swung to the contact 29, various accessories on the wire 30 can be electrically operated without the ignition of the automobile being on. If the ignition switch is swung the other way to the contacts 31 and 32, the wire 30 is again alive and so is the ignition wire 33 so that, when the motor starter is operated, the motor will start. In either of these swung positions, current from the wire 28 will flow along the wire 36 and the coil 17 becomes energized, as its opposite end is grounded through the wire 37. The coil 17 lifts the keeper 19 and so opens the contacts 21 and 22. At this time the keeper 19 makes an idle movement as no useful work is done.

If the light switch 14 is operated to turn on any of the lights of the automobile while the ignition switch is on, the rear light of the automobile will automatically go on too as the contact 34 will be connected to the main wire 28. Accordingly, live current is connected to the wire 38, the open contacts 24 and the open finger-pressure switch 27, while at the same time it is connected through the closed contacts 23 and along the wire 39 to the now open contacts 21. Under such conditions no parts are operated but the ignition switch is on and the motor normally running.

If the ignition switch 15 is now turned off, or if the ignition switch had been off when the light switch was turned on, the keeper 19 will drop to, or would be in the position shown in the drawings, with the contacts 21 and 22 closed as no current is passing through the coil 17. Accordingly, current from the wire 38, through wire 39, will pass through the contacts 21, along the wire 40, and operate the light 26 and the buzzer 25. This notifies the driver that the lights are on and he can then decide whether they should be shut off.

If the driver desires to leave the lights on with the motor not running, he merely presses the finger button of the switch 27. By so doing, the contacts 24 are temporarily shorted through this latter switch and then the short is removed as the finger pressure is released. During this momentary connection, current flows along the wire 42, along the wire 43, through the contacts 22, along the wire 44, and energizes the induction coil 18 as the opposite end of this latter coil is grounded by the wire 45. The energized coil lifts the keeper 20 which opens the contacts 23 to disconnect current from the light 26 and buzzer 25, while at the same time the contacts 24 close and and short the finger-pressure switch 27 to maintain the coil 18 in an energized condition and the keeper 20 lifted. When the light switch 14 is turned off the coil 18 becomes de-energized and the keeper 20 drops so that all parts are again as shown in Figure 2. On the other hand, if the ignition switch 15 is turned on while the light switch 14 is on, the induction coil 17 becomes energized, lifts the keeper 19 and so opens the contacts 21 and 22. This results in the keeper 20 dropping as the coil 18 is de-energized and the light 26 and buzzer 25 stop working as their current is shut off.

From the above description it will be seen that the signals (light 26 and buzzer 25) are only operable when the lights of the automobile are on and the motor not running so that the driver is positively warned before he leaves same, unless the motor is running, and then he will not leave it for long. If he wishes to leave the lights on while the motor is idle, he can do so without being annoyed by the signal, merely by pressing the finger switch 27.

The device is extremely simple, very efficient, and can be easily installed by merely connecting the wires 36 and 38 to the automobile wiring. It could be built into the automobile if desired instead of connection as an attachment. While I have shown both a signal light and a signal buzzer it will be appreciated that either could be used alone. It is also contemplated to provide the finger-pressure switch with means for continuous closure to completely shut off the signal operation for a period of time when desired. The device could also be used on other electrical equipment where notification will report that certain switches are left on.

What I claim as my invention is:

1. In an automobile having an ignition switch and a light controlling switch; a signal for the lights of said automobile, comprising: an electrically operable signal; a finger-pressure switch; a pair of keeper-operable induction coils; a circuit, closed by the turning on of said light switch for operably connecting same with said signal; a circuit, closed by the turning on of said ignition switch, for energizing one of said induction coils to keeper-open the circuit between said signal and said light switch; a circuit, connected by a temporary closing of said finger-pressure switch, when said light switch is on and said ignition switch is off, to connect said light switch, through openable contacts controlled by said one induction coil, with the other of said induction coils, to keeper open the circuit between said signal and said light switch and short said finger-pressure switch to maintain said latter induction coil energized on the subsequent opening of said finger-pressure switch.

2. In an automobile electrical system, including a switch for the ignition thereof and a switch for the lights thereof; a signal device for said lights, comprising: a container; an electrically operable signal carried by said container; a finger-pressure switch carried by said container; a pair of keeper-operable induction coils within said container; a pair of cables extending from said container for connection, one to said ignition switch and one to said light switch; a circuit from said light switch cable to said signal for operation of same when electric power is applied to said latter cable by said light switch; a circuit from said ignition switch cable through one of said induction coils to keeper-open the circuit between said signal and said light switch cable, when electric power is applied to said ignition switch cable by said ignition switch; a circuit connected through said finger-pressure switch, when said light switch cable is alive and said ignition switch cable is dead, to connect said light switch cable, through openable contacts controlled by said one induction coil, with the other of said induction coils, to keeper open the circuit between said signal and said light switch cable and short said finger-pressure switch.

References Cited in the file of this patent

UNITED STATES PATENTS

| | | |
|---|---|---|
| 1,048,179 | Krantz | Dec. 24, 1921 |
| 1,461,215 | Hunt | July 10, 1923 |
| 2,101,407 | Moreland | Dec. 7, 1937 |
| 2,439,634 | Robey | Apr. 13, 1948 |
| 2,507,398 | Castro | May 9, 1950 |

FOREIGN PATENTS

| | | |
|---|---|---|
| 601,058 | Great Britain | Apr. 27, 1948 |